US007281732B2

(12) United States Patent
Fox et al.

(10) Patent No.: US 7,281,732 B2
(45) Date of Patent: Oct. 16, 2007

(54) STROLLER WITH TRAY FOLD AND FOLD LATCH MECHANISMS

(75) Inventors: Daniel R. Fox, Greenville, OH (US); Dean R. Holzberger, Belgium, WI (US); Debra J. Miller, Grafton, WI (US); Scott A. Walterman, Madison, WI (US)

(73) Assignee: Evenflo Company, Inc., Vandalia, OH (US)

( * ) Notice: Subject to any disclaimer, the term of this patent is extended or adjusted under 35 U.S.C. 154(b) by 340 days.

(21) Appl. No.: 11/013,310

(22) Filed: Dec. 15, 2004

(65) Prior Publication Data

US 2006/0125210 A1    Jun. 15, 2006

(51) Int. Cl.
*B62K 1/00* (2006.01)
(52) U.S. Cl. ..................................... 280/642; 280/650
(58) Field of Classification Search .................. 280/38, 280/641, 642, 647, 648, 650, 657, 658, 47.38; 224/409, 411
See application file for complete search history.

(56) References Cited

U.S. PATENT DOCUMENTS

| | | | | |
|---|---|---|---|---|
| 4,515,389 | A | * | 5/1985 | Kassai ......................... 280/642 |
| 4,706,986 | A | | 11/1987 | Kassai |
| 4,832,361 | A | | 5/1989 | Nakao et al. |
| 4,856,809 | A | | 8/1989 | Kohus et al. |
| 4,915,401 | A | | 4/1990 | Severson et al. |
| 5,039,118 | A | | 8/1991 | Huang |
| 5,110,150 | A | | 5/1992 | Chen |
| 5,203,577 | A | | 4/1993 | Kato |
| 5,244,228 | A | * | 9/1993 | Chiu ........................... 280/642 |
| D341,555 | S | | 11/1993 | Cone et al. |
| 5,257,799 | A | | 11/1993 | Cone et al. |
| 5,382,074 | A | | 1/1995 | Pietra |
| 5,417,450 | A | | 5/1995 | Wang |
| 5,437,493 | A | | 8/1995 | Weisleder |
| 5,511,441 | A | | 4/1996 | Arai |
| 5,524,503 | A | | 6/1996 | Ishikura |
| 5,535,483 | A | | 7/1996 | Cabagnero |
| 5,655,817 | A | | 8/1997 | Nienow |
| 5,676,386 | A | | 10/1997 | Huang |
| 5,725,238 | A | | 3/1998 | Huang |
| 5,727,798 | A | | 3/1998 | Walters et al. |
| 5,743,671 | A | | 4/1998 | Williams |
| 5,755,455 | A | | 5/1998 | Chen et al. |
| 5,765,958 | A | | 6/1998 | Lan |
| 5,772,279 | A | | 6/1998 | Johnson, Jr. |
| 5,775,718 | A | | 7/1998 | Huang |
| 5,794,951 | A | | 8/1998 | Corley et al. |
| 5,820,140 | A | * | 10/1998 | Huang ......................... 280/30 |

(Continued)

*Primary Examiner*—Frank Vanaman
(74) *Attorney, Agent, or Firm*—Taft Stettinius & Hollister LLP (57) ABSTRACT

An infant stroller having a fold latch mechanism to lock the stroller in the unfolded or deployed configuration. The side of the stroller contains a latchkey piece having a pocket-like recess that engages a latchpin on the stroller's front leg. When the latchkey is in the locked position, the front legs are held in place, locking the stroller in the unfolded or deployed configuration. When the latchkey is disengaged from the latchpin on the front leg, the front leg can be rotated to allow the stroller to be folded for storage or transport. The stroller also has a latching mechanism for locking the tray unit in place during normal use. The tray unit becomes unlocked and can be tucked away during the folding process.

17 Claims, 10 Drawing Sheets

U.S. PATENT DOCUMENTS

| | | |
|---|---|---|
| 5,845,916 A | 12/1998 | Stroud |
| 5,845,924 A * | 12/1998 | Huang ........................ 280/642 |
| 5,855,384 A | 1/1999 | Pike et al. |
| 5,876,046 A | 3/1999 | Courtney et al. |
| 5,876,057 A | 3/1999 | Huang |
| 5,882,030 A | 3/1999 | Haut |
| 5,934,153 A | 8/1999 | Yang |
| 5,938,229 A | 8/1999 | Chen et al. |
| 5,947,555 A | 9/1999 | Welsh, Jr. et al. |
| 5,964,501 A | 10/1999 | Magnani |
| 5,979,928 A | 11/1999 | Kuo |
| 5,988,669 A | 11/1999 | Freese et al. |
| 6,068,284 A | 5/2000 | Kakuda |
| 6,070,890 A | 6/2000 | Haut et al. |
| 6,101,678 A | 8/2000 | Malloy et al. |
| D435,196 S | 12/2000 | Gregor et al. |
| 6,155,740 A | 12/2000 | Hartenstine |
| 6,179,321 B1 * | 1/2001 | Sun ............................ 280/658 |
| 6,273,451 B1 | 8/2001 | Julien et al. |
| 6,299,194 B1 * | 10/2001 | Chen ........................ 280/642 |
| 6,302,613 B1 | 10/2001 | Lan |
| 6,322,098 B1 * | 11/2001 | Lan ............................ 280/642 |
| 6,331,032 B1 | 12/2001 | Haut et al. |
| 6,368,006 B1 | 4/2002 | Yang et al. |
| 6,375,213 B1 * | 4/2002 | Suzuki ........................ 280/649 |
| 6,398,233 B1 | 6/2002 | Liang et al. |
| 6,409,205 B1 | 6/2002 | Bapst et al. |
| 6,443,479 B2 | 9/2002 | Huang |
| 6,478,327 B1 | 11/2002 | Hartenstine et al. |
| 6,478,328 B1 | 11/2002 | Yeh et al. |
| 6,523,853 B1 | 2/2003 | Cheng |
| 6,557,885 B1 | 5/2003 | Kakuda |
| 6,572,134 B2 | 6/2003 | Barrett et al. |
| 6,666,473 B2 | 12/2003 | Hartenstine et al. |
| 6,698,773 B2 * | 3/2004 | Hsia ........................ 280/47.38 |
| 6,698,788 B2 | 3/2004 | Yang |
| 7,044,498 B2 * | 5/2006 | Chen ........................ 280/642 |
| 2002/0041082 A1 | 4/2002 | Perego |
| 2002/0121766 A1 | 9/2002 | Suzuki |
| 2002/0175498 A1 | 11/2002 | Yang et al. |
| 2002/0197102 A1 | 12/2002 | Cheng |
| 2003/0201626 A1 | 10/2003 | Hartenstine et al. |
| 2004/0041368 A1 | 3/2004 | Cheng |

* cited by examiner

STROLLER WITH TRAY FOLD AND FOLD LATCH MECHANISMS

BACKGROUND OF THE INVENTION

This invention relates to an infant stroller, and in particular to a fold and latch mechanism for an infant stroller.

The prior art includes infant strollers capable of being folded, as well as strollers with trays capable of being folded. Although some of the strollers seen in the prior art include latching and locking mechanisms that interact with the stroller legs and frame components to lock the stroller in place when unfolded, none of the prior art describes latching and locking mechanisms of the type described and claimed herein.

SUMMARY

The present invention is directed generally to an infant stroller having a fold latch mechanism to lock the stroller in the unfolded or deployed configuration. The stroller also has a latching mechanism for locking the tray unit in place during normal use. The tray unit becomes unlocked and can be tucked away during the folding process.

Accordingly, it is a first aspect of the present invention to provide an infant stroller comprising: at least one side member; at least one front leg joined to the side member and capable of rotating with respect to the side member, the front leg having a nub capable of engaging a latchkey for preventing rotation of the front leg with respect to the side member; at least one rear leg joined to the side member and capable of rotating with respect to the side member; at least one handle bar joined to the side member; a locking mechanism for preventing rotation of the front leg with respect to the side member, the locking mechanism comprising a latchkey pivotally attached to the side member, the latchkey having a recess capable of engaging the nub on the front leg, and the latchkey capable of rotating with respect to the side member; and at least one frame member pivotally joining the front leg to the rear leg and capable of preventing the rear leg from pivoting away from the front leg when the front leg is locked by the locking mechanism; wherein the front leg is locked in a fixed position with respect to the side member when the latchkey is positioned such that its recess is engaged with the nub on the front leg; and wherein the front leg is unlocked, thereby capable of rotating with respect to the side member, when the latchkey is positioned such that its recess is disengaged from the nub on the front leg. In a detailed embodiment, the stroller has a biasing element for biasing the latchkey to the locked position. The biasing element, which can be positioned on the end of the latchkey, can be a spring that is received on one end by a nub on the end of the latchkey and is received on the opposite end by a nub on the side member.

In an alternative detailed embodiment of the first aspect of the present invention, the stroller can be folded, when the latchkey is positioned such that its recess is disengaged from the nub on the front leg, by rotating the front leg and rear leg such that the side member becomes approximately parallel to the front leg and rear leg. In another alternative detailed embodiment, the latchkey includes a wheel portion and an arm portion; and the recess is located on the arm portion. In yet another alternative detailed embodiment, the stroller has at least one cable joined to the latchkey and capable of manipulating the latchkey between engaged and disengaged positions. In a more detailed embodiment, upon application of a force to the cable, the latchkey is rotated with respect to the side member such that the recess is disengaged from the nub on the front leg. In an alternative more detailed embodiment, the stroller includes a latch release control joined to the cable and capable of being depressed by a user. In an even more detailed embodiment, the stroller can include a handle assembly joined to the top of the handle bar, where the latch release control is joined to the handle assembly, and where the cable is located in the interior of the handle bar.

It is a second aspect of the present invention to provide an infant stroller comprising: at least one side member; at least one front leg joined to the side member and capable of rotating with respect to the side member; a tray unit including a tray and at least one tray arm, the tray arm joined to the side member and capable of rotating with respect to the side member, the tray arm having a graduated recess on its side face having a deep end and a shallow end, the shallow end being flush with the side face of the tray arm; and a tray locking mechanism for preventing rotation of the tray arm with respect to the side member, the tray locking mechanism comprising: a frame; a latchpin capable of engaging the recess in the tray arm; a carrier for holding the latchpin in place and capable of sliding within the frame; a first spring to provide restoring force to the latchpin when depressed; and a second spring to provide restoring force to the carrier; wherein the latchpin is engaged with the deep end of the recess on the tray arm when the front leg is in an unfolded position with respect to the side member, thereby locking the tray arm and the tray in a fixed position with respect to the side member; and wherein the latchpin is engaged with the shallow end of the recess on the tray arm when the front leg is in a folded position with respect to the side member, thereby allowing the tray arm and the tray to rotate with respect to the side member. In a detailed embodiment, the carrier of the tray locking mechanism unit is positioned such that the latchpin is engaged with the deep end of the recess on the tray arm when the front leg is in an unfolded position with respect to the side member, thereby locking the tray arm and the tray in a fixed position with respect to the side member and, upon rotation of the front leg to a folded position, the carrier of the tray locking mechanism unit is positioned such that the latchpin is engaged with the shallow end of the recess on the tray arm, thereby allowing the tray arm and the tray to rotate with respect to the side member. The second aspect of the present invention can be practiced with any of the features or embodiments described above with respect to the first aspect of the present invention.

DETAILED DESCRIPTION

Figure 1:
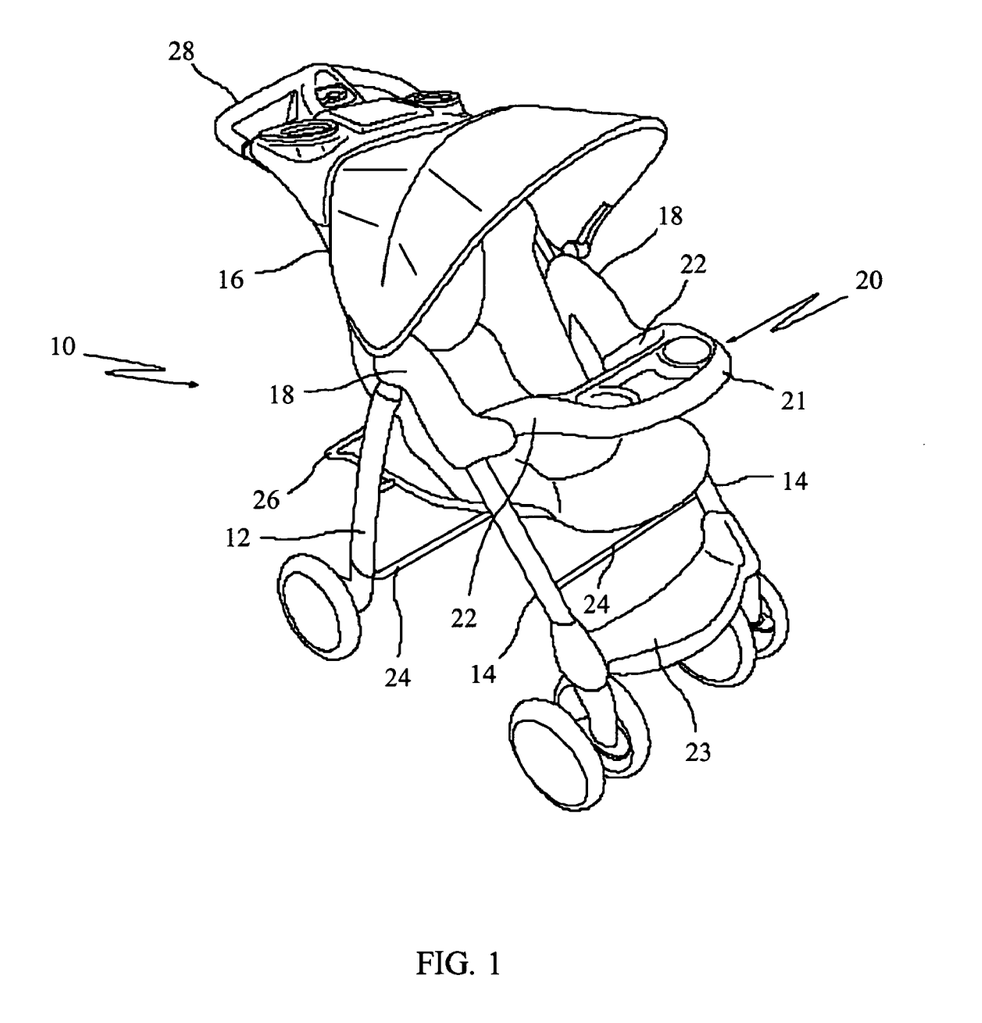
FIG. 1 shows a perspective view of the infant stroller according to an embodiment of the present invention.

FIG. 1 shows a perspective view of the infant stroller 10 according to an embodiment of the present invention. The stroller 10 is generally formed from a frame including rear legs 12, front legs 14, and handle bars 16. One each of the rear legs, front legs, and handle bars is pivotally joined to a side member 18 to form each of the left and right sides of the frame. The side member 18 generally has two parallel side panels joined by a closed upper edge, resulting in a U-shaped cross-section. The legs and handle bars extend into the resulting cavity enclosed between the two parallel faces of the side member 18, and various components described below are housed in this cavity and fastened to one or both of the side panels. Accordingly, the right and left sides of the stroller each include one rear leg 12, one front leg 14, one handle bar 16, and one side member 18. The right and left sides of the frame are joined by several cross braces, including the front base panel 23, the two rods 24, the undercarriage 26, and the handle assembly 28. In addition to the aforementioned frame components, the stroller includes a tray unit 20 that is joined to the two side members 18.

Figure 2:
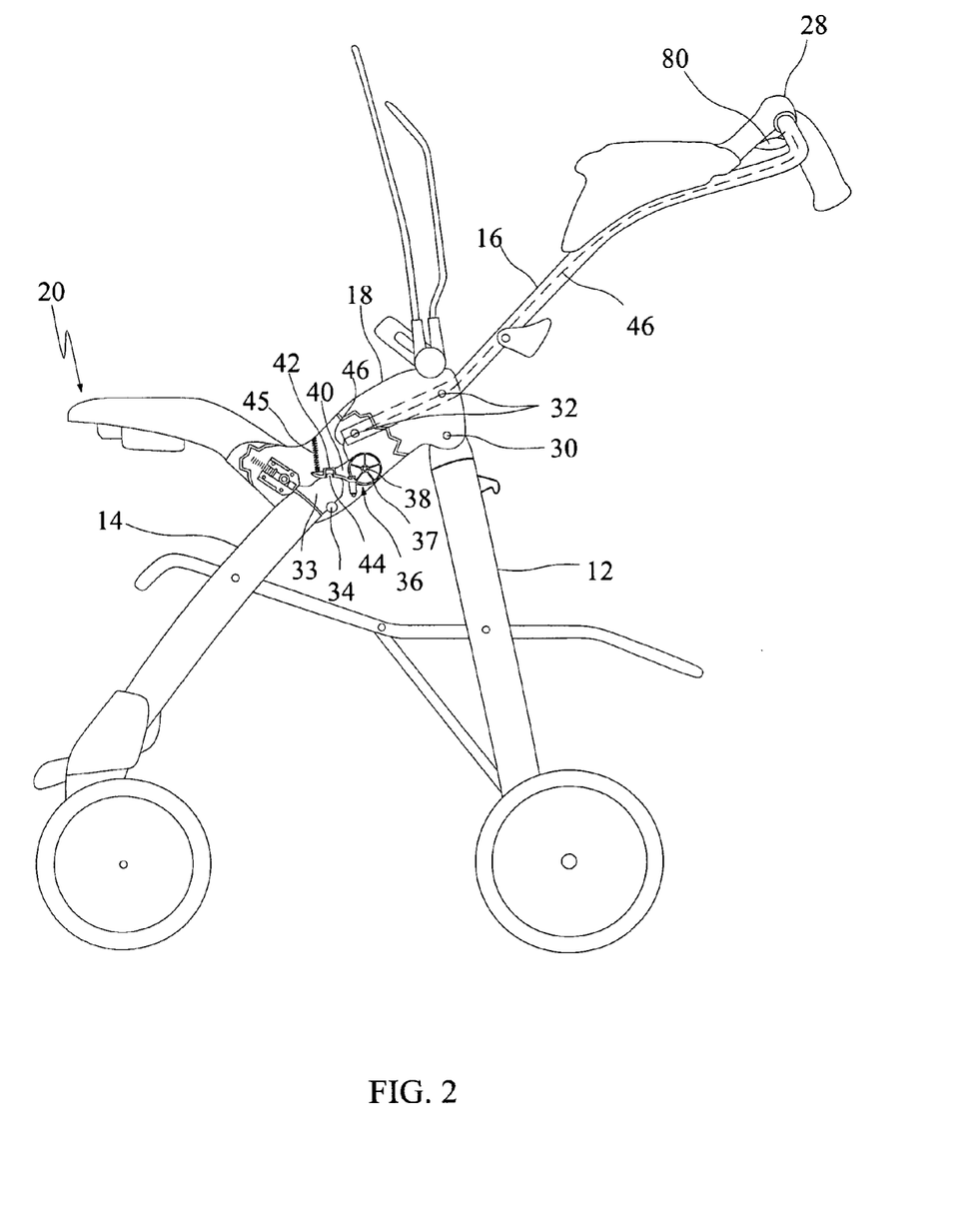
FIGS. 2 and 3 are cutaway side views of the infant stroller according to an embodiment of the present invention, showing the connection of the various components to the side member. The stroller is in the unfolded or deployed configuration in this view.
Figure 3:
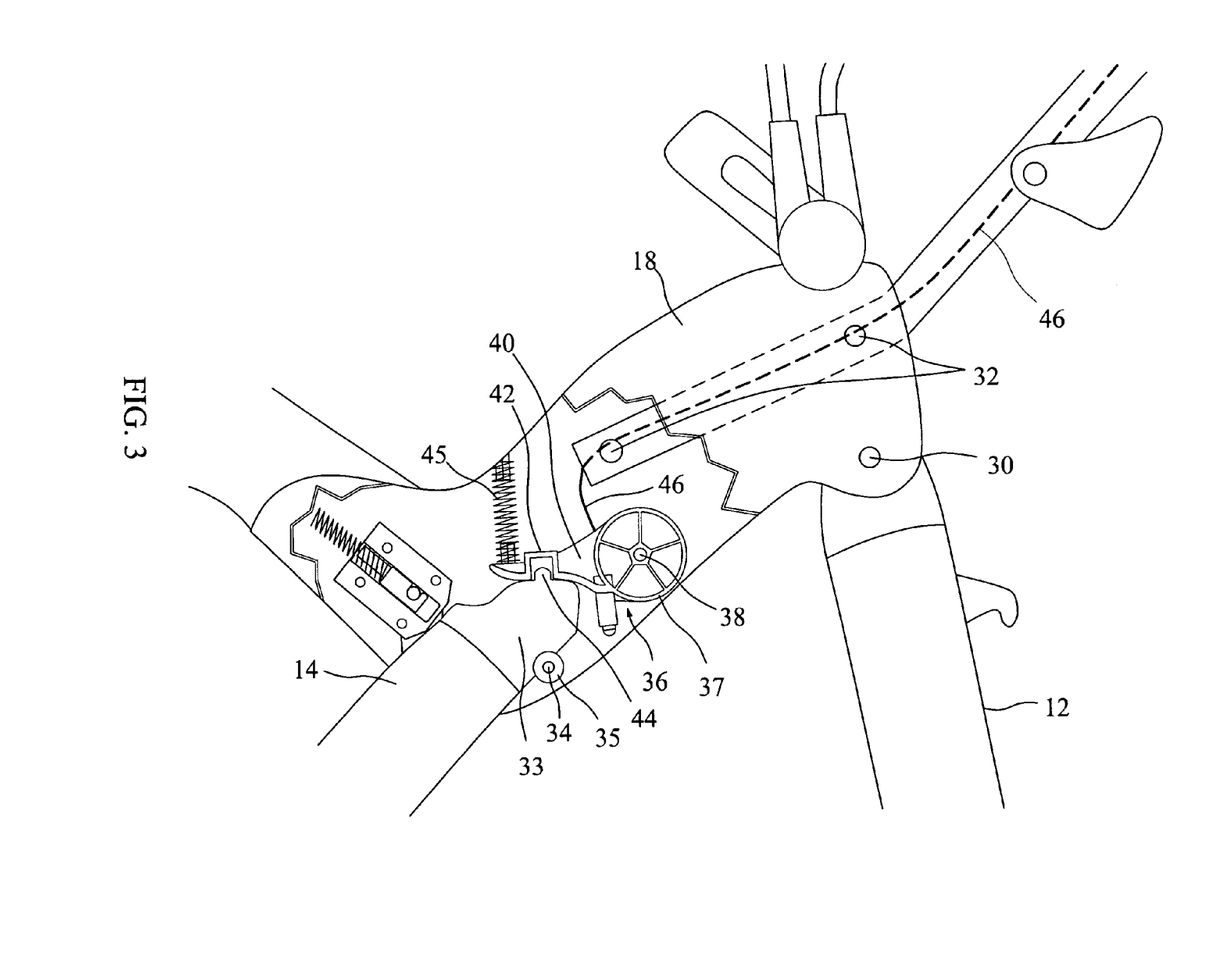

FIGS. 2 and 3 are cutaway side views, which show the connection of the various components to the side member 18. The rear leg 12 is connected to the side member 18 at point 30, which allows free rotation. The handle bar 16 is connected to the side member 18 at points 32. The front leg 14 is connected to the side member 18 through the leg cap 33 at point 34, which allows rotation. The ability of the front leg 14 to rotate about its attachment point 34 is governed by latchkey 36, which is pivotally connected to the side member 18 at point 38.

Figure 8:
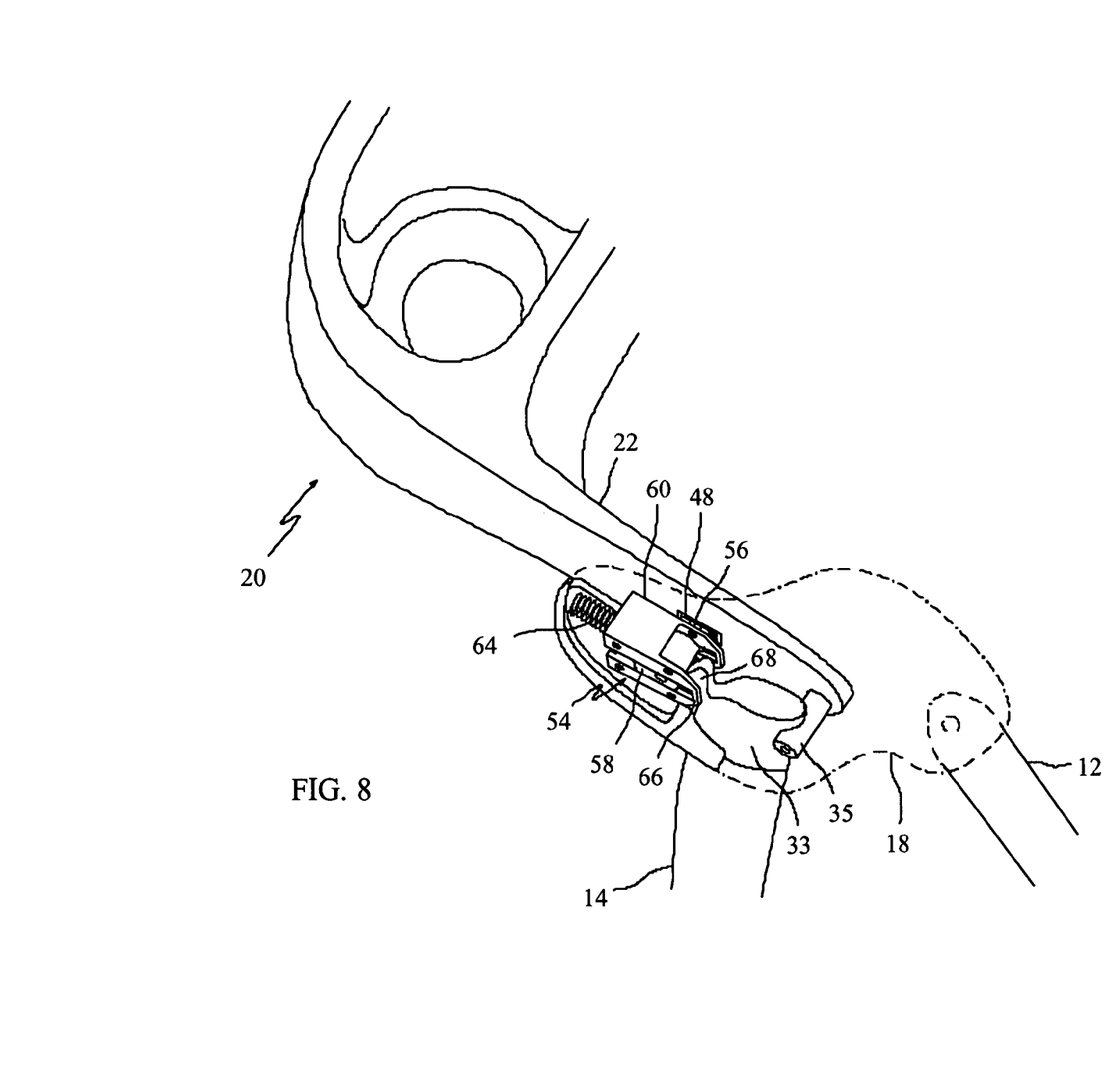
FIG. 8 is a cutaway perspective view showing the various components of the latch release mechanism and the tray lock mechanism of the infant stroller according to an embodiment of the present invention. The stroller is in the unfolded or deployed configuration in this view.
Figure 10:
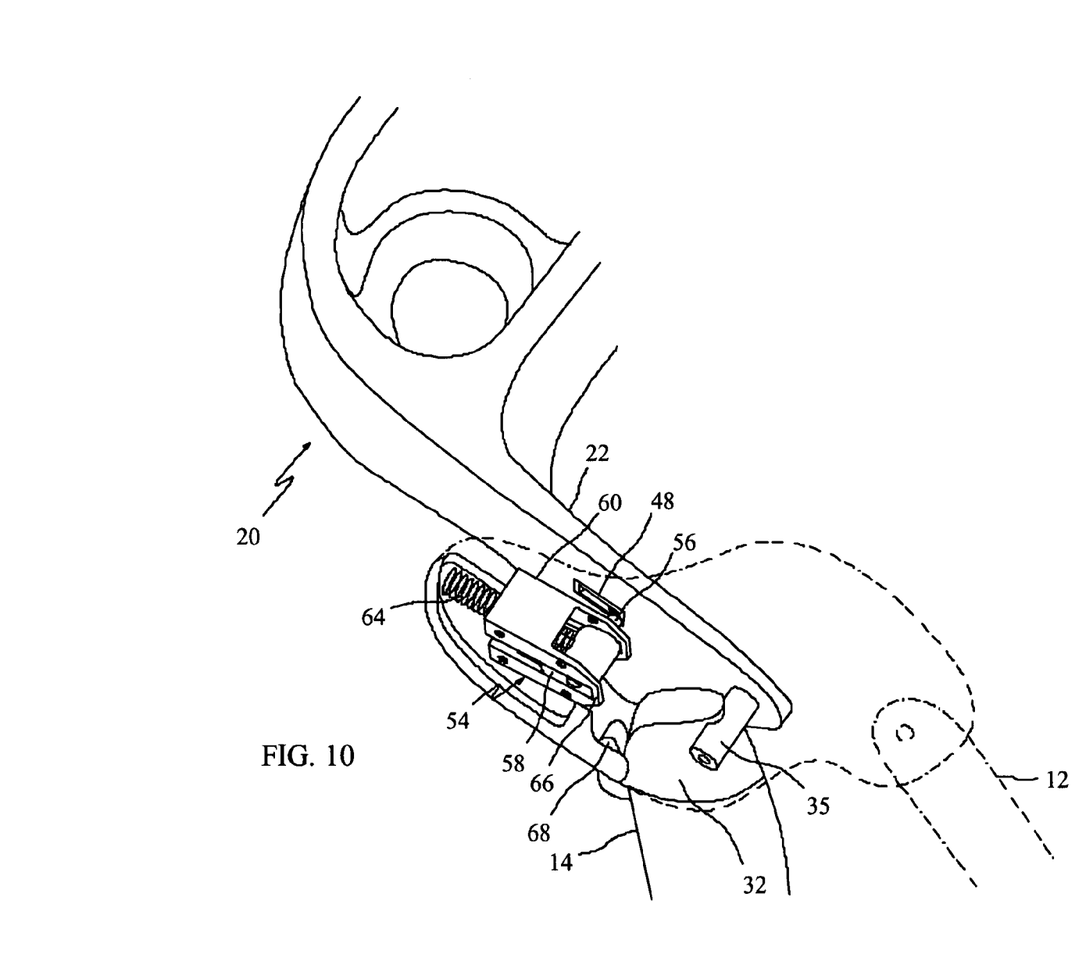
FIG. 10 is a cutaway perspective view showing the various components of the latch release mechanism and the tray lock mechanism of the infant stroller according to an embodiment of the present invention. The stroller is in a partially folded configuration in this view.

The attachment and rotation of the front leg 14 can also be seen in the perspective views of FIGS. 8 and 10. The front leg 14 has a leg cap 33 on its top end, and the front leg 14 is joined to the side member 18 through a cylindrical sleeve 35 located on the edge of the leg cap 33. The resulting off-center point of rotation for the front leg 14 allows a nub 68 on the leg cap 33 to operate the tray lock mechanism 54 during rotation of the front leg, as explained below.

Figure 4:
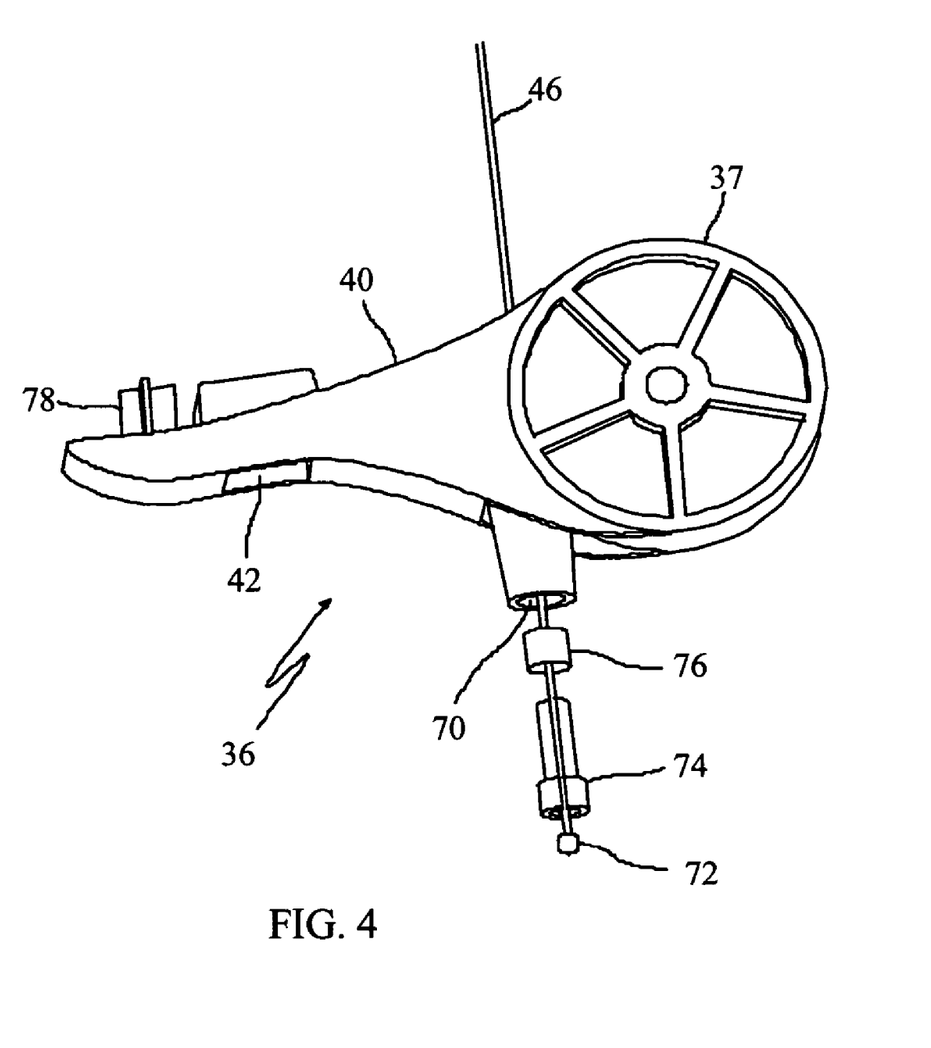
FIG. 4 is a closeup view showing the latchkey piece and the cable's connection to the latchkey piece.

FIG. 4 shows a closeup view of the latchkey 36, which includes a wheel portion 37 and an arm portion 40 containing a recess 42 for receiving nub 44 on the leg cap 33. A cable 46 is connected to the latchkey through an opening 70 and serves to apply force tangential to the wheel portion 37 in order to rotate the latchkey, as explained below. The cable 46 is secured by a bead 72, which fits into one end of a cylindrical sleeve 74. The cylindrical sleeve 74 fits into a bushing 76, which fits into an opening 70 in the latchkey 36. The attachment fairing 78 provides an attachment point for spring 45, which provides restoring force to hold the latchkey in a locked position, as explained below.

In the configuration depicted in FIGS. 2 and 3, the latchkey 36 is positioned such that its recess 42 is engaged with nub 44 on the leg cap 33, thus preventing rotation of the front leg 14 about its attachment point 34. Because the front legs 14 are joined to the rear legs 12 by undercarriage 26, the rear leg 12 is also prevented from rotating about its attachment point 30 in this configuration. Thus, when the latchkey 36 is positioned as shown in FIGS. 2 and 3, the stroller is locked in the unfolded or deployed configuration. Spring 45 provides restoring force to the latchkey 36, biasing it in the locked position shown in FIGS. 2 and 3 to prevent the stroller from folding absent intention of the user.

Figure 5:
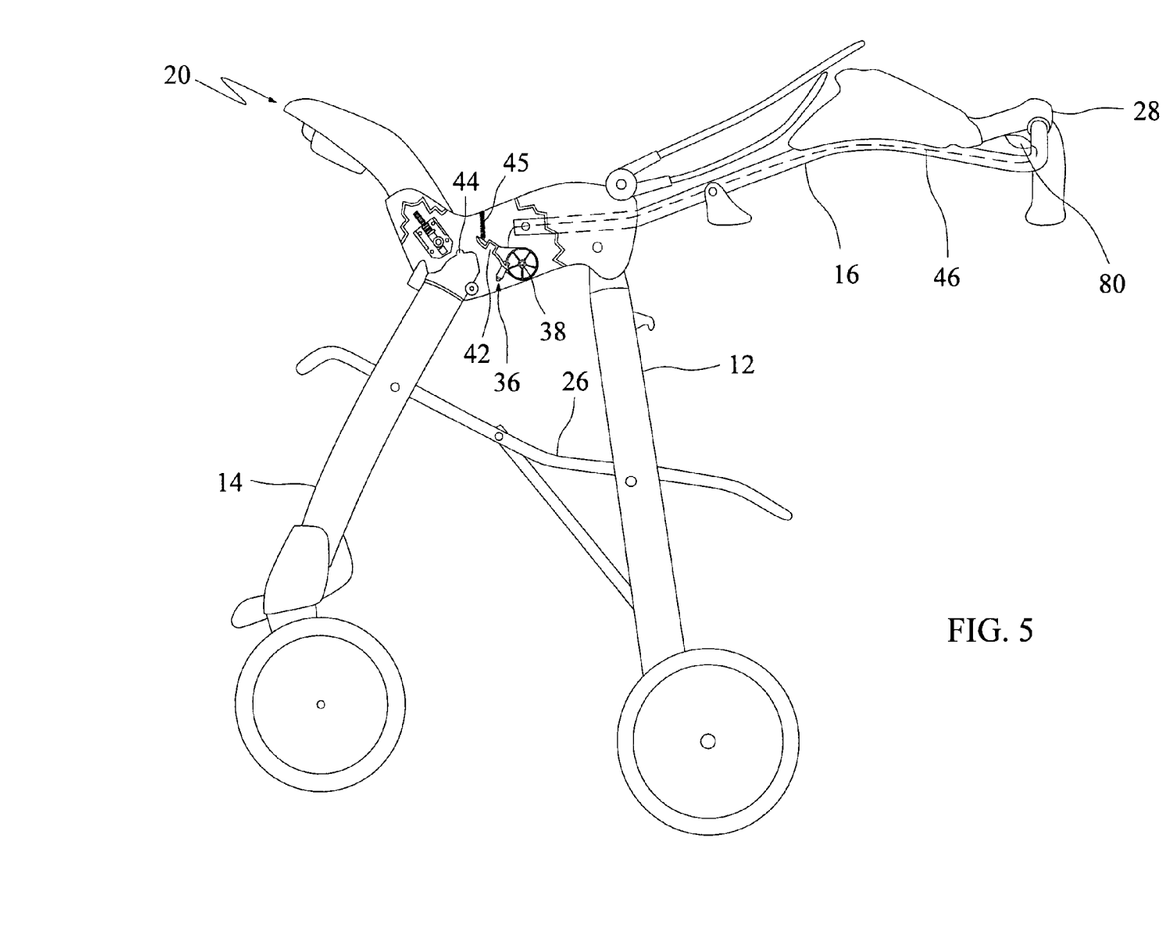
FIG. 5 is cutaway side view of the infant stroller according to an embodiment of the present invention, showing the connection of the various components to the side member. The stroller is in a partially folded configuration in this view.

The fold process is initiated by rotating latchkey 36 about its attachment point 38 so that its recess 42 is no longer engaged with the nub 44, as shown in FIG. 5. This rotation of the latchkey 36 can be accomplished by applying force to a cable 46 that can be routed through the handle bars 16 and connected to a latch release 80 located in the handle assembly 28. The cable applies an upward force to the latchkey tangential to the wheel portion 37, thus overcoming the downward restoring force exerted by the spring 45, and the latchkey 36 can rotate in a clockwise direction. When the recess 42 is disengaged from the nub 44, the front leg 14 is able to rotate about its attachment point 34.

Figure 6:
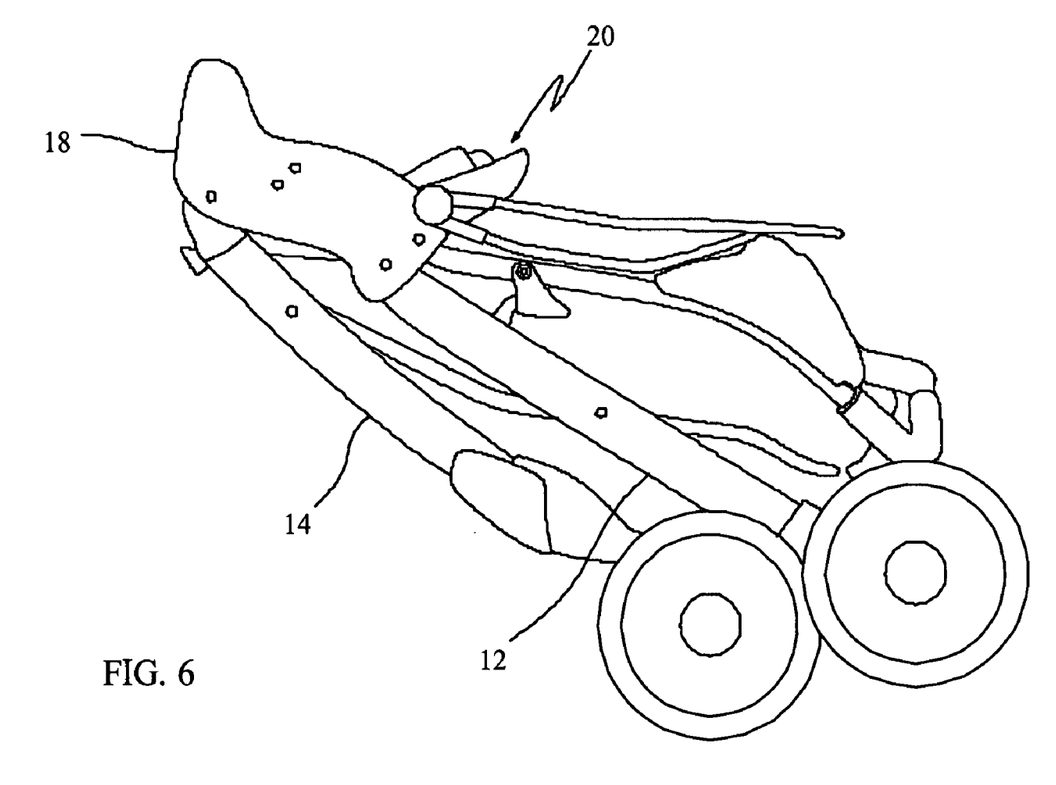
FIG. 6 is a side view of the infant stroller according to an embodiment of the present invention, showing the stroller in a completely folded configuration.

FIG. 5 shows the stroller after the folding process has been commenced and the legs have begun to rotate. The front leg 14 begins to fold back (counterclockwise when viewed from the stroller's left side, as in FIG. 5). The rear leg 12, which is connected to the front leg 14 by the undercarriage 26, begins to fold back as well. As the folding process continues, the front legs 14 and rear legs 12 continue to fold back, approaching a parallel alignment. FIG. 6 shows the stroller after the folding process has been completed, with the front legs 14 and rear legs 12 nearly parallel.

Figure 7:
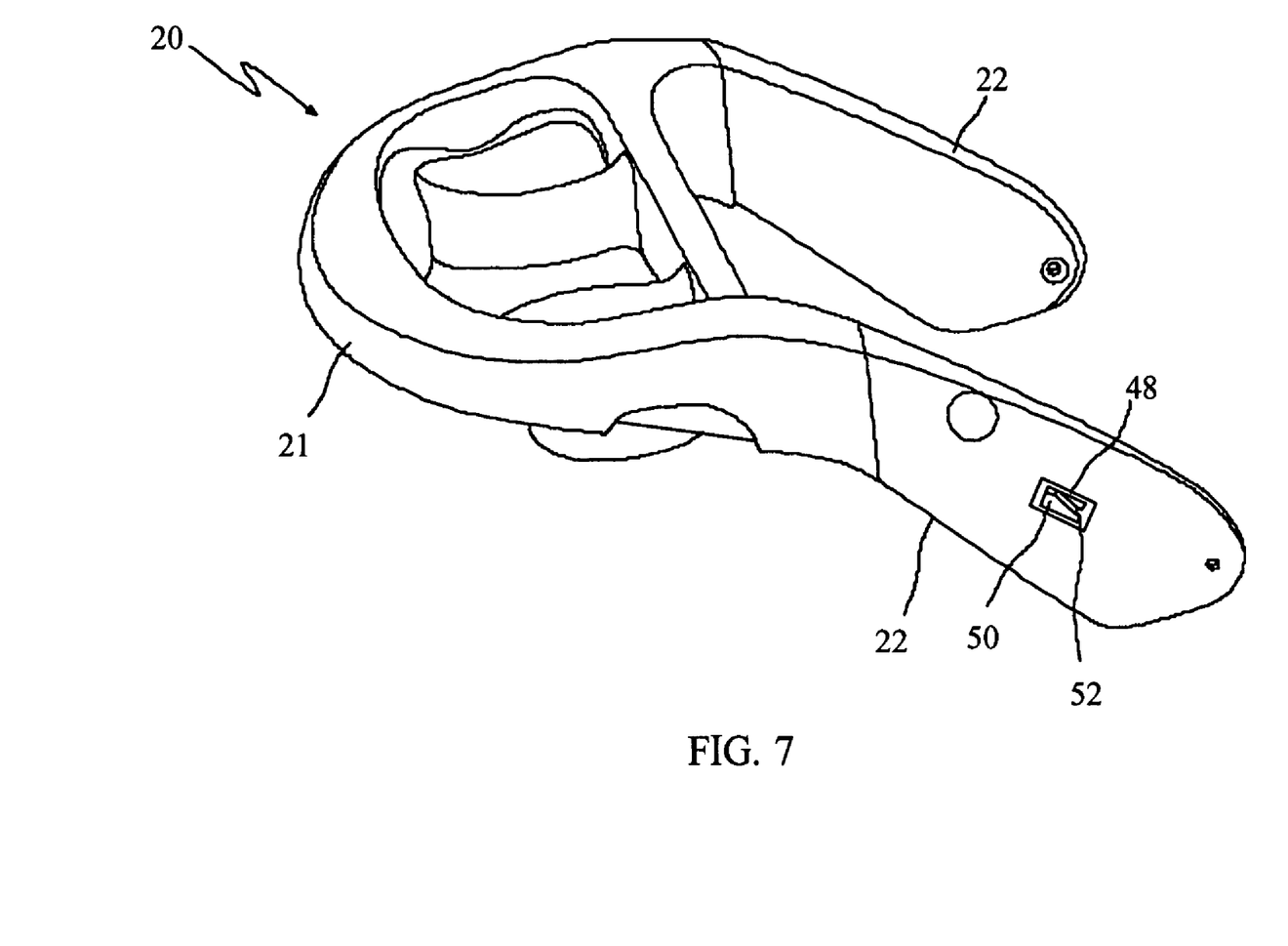
FIG. 7 shows the tray unit of the infant stroller according to an embodiment of the present invention.

In addition to folding the legs to a nearly parallel configuration, the fold process also allows the tray unit 20 to fold into the approximate plane of the folded legs. The tray unit 20 is shown in FIG. 7 and generally consists of the tray 21 and two tray arms 22 that connect the tray to the two side members 18. Each tray arm 21 has a recess 48 on its side. The recess 48 has a deep portion 50 and a narrow portion 52 for engaging a latchpin 56 on the tray lock mechanism 54, as explained below.

Figure 9:
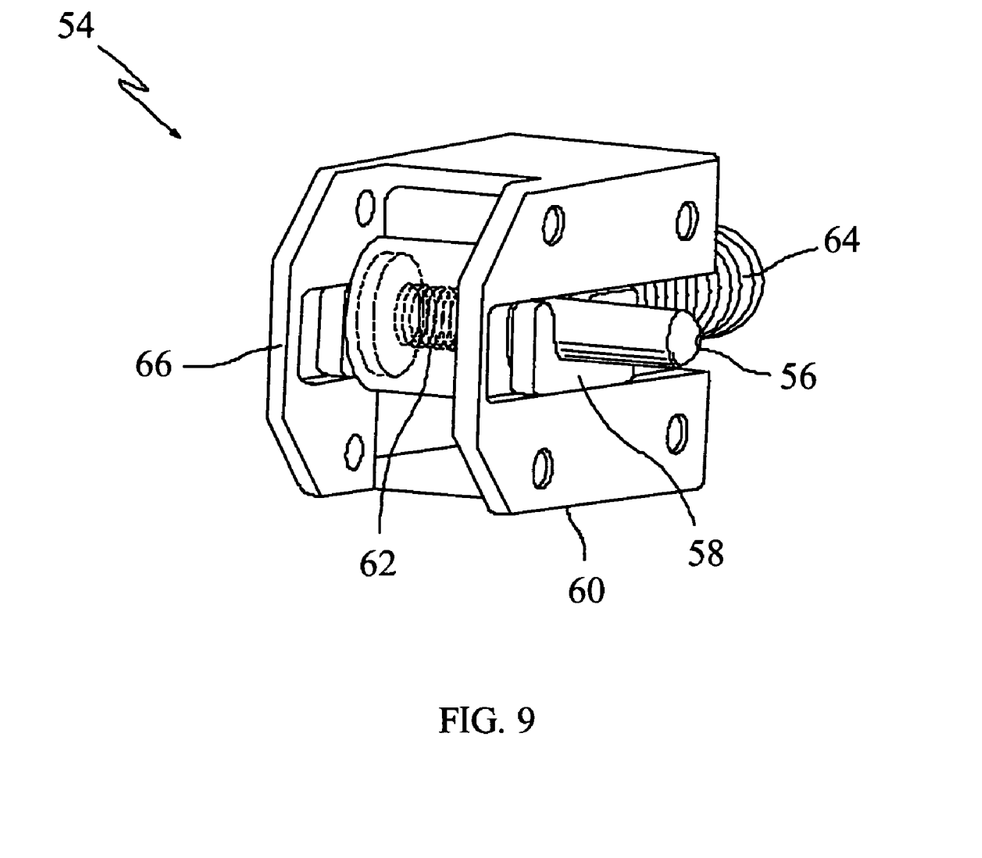
FIG. 9 shows the tray lock mechanism of the infant stroller according to an embodiment of the present invention.

FIG. 8 is a perspective view showing the interaction of the tray arm 22 with the side member 18. The tray arm 22 on each side is pivotally connected to the side member 18 at the same point 34 where the front leg 14 is connected. Inside the side member 18 is located a tray lock mechanism 54 that is shown in more detail in FIG. 9. The tray lock mechanism 54 includes the latchpin 56 that engages the aforementioned recess 48 in the tray arm 22. The latchpin 56 is held in place by a carrier 58 that can slide within a frame 60. A first spring 62 provides restoring force to the latchpin 56 when depressed, and a second spring 64 provides restoring force to the carrier 58 in the direction of the closed end 66 of the frame 60.

Returning to FIG. 8, which shows the stroller in the unfolded or deployed configuration, the latchpin 56 is engaged with the deep portion 50 of the recess 48 in the tray arm 22. In this configuration, the latchpin 56 prevents the tray arm 22, and hence the tray assembly 20, from rotating.

When the folding process has commenced, the carrier 58 slides within the frame 60 to the configuration shown in FIG. 10, carrying the latchpin 56 with it. The carrier 58, including the latchpin 56, moves so that the latchpin 56 is aligned with the shallow portion 52 of the recess 48 in the tray arm 22. This movement of the carrier 58 is initiated by the rotation of the front leg 14, which rotates the leg cap 33 on the front leg 14 so that the nub 68 on the leg cap 33 is no longer in contact with the carrier 58. As a result of this disengagement of the nub 68 from the carrier 58, the second spring 64 pushes the carrier 58 to the closed end 66 of the frame 60, thus moving the latchpin 56 so that it is aligned with the shallow portion 52 of the recess 48 on the tray arm 22. Because the shallow portion 52 is flush with the surface of the tray arm 22, the tip of the latchpin 56 is now flush with the surface of the tray arm 22; the latchpin 22 is no longer engaged with the recess 48 in a way that would prevent rotation of the tray arm 22. The tray arm 22 is now free to rotate with respect to the side member 18, as shown in FIG. 10. During the folding process, the user can manually rotate the tray unit 20 to tuck it between the side members 18 for transportation or storage.

Having described the invention with reference to embodiments, it is to be understood that the invention is defined by the claims and it not intended that any limitations or elements describing the embodiments set forth herein are to be incorporated into the meanings of the claims unless such limitations or elements are explicitly listed in the claims. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. An infant stroller comprising:
at least one side member;
at least one front leg joined to the side member and capable of rotating with respect to the side member, the front leg having a nub capable of engaging a latchkey for preventing rotation of the front leg with respect to the side member;
at least one rear leg joined to the side member and capable of rotating with respect to the side member;
at least one handle bar joined to the side member;
a locking mechanism for preventing rotation of the front leg with respect to the side member, the locking mechanism comprising a latchkey pivotally attached to the side member, the latchkey having a recess capable of engaging the nub on the front leg, and the latchkey capable of rotating with respect to the side member;
a biasing element for biasing the latchkey to a locked position; and
at least one frame member pivotally joining the front leg to the rear leg and capable of preventing the rear leg from pivoting away from the front leg when the front leg is locked by the locking mechanism; wherein
the front leg is locked in a fixed position with respect to the side member when the latchkey is positioned such that its recess is engaged with the nub on the front leg;
the biasing element is positioned on the end of the latchkey;
the biasing element is a spring, and the spring is received on one end by a nub on the end of the latchkey and is received on the opposite end by a nub on the side member; and wherein
the front leg is unlocked, thereby capable of rotating with respect to the side member, when the latchkey is positioned such that its recess is disengaged from the nub on the front leg.

2. An infant stroller comprising:
at least one side member;
at least one front leg joined to the side member and capable of rotating with respect to the side member, the front leg having a nub capable of engaging a latchkey for preventing rotation of the front leg with respect to the side member;
at least one rear leg joined to the side member and capable of rotating with respect to the side member;
at least one handle bar joined to the side member;
a locking mechanism for preventing rotation of the front leg with respect to the side member, the locking mechanism comprising a latchkey pivotally attached to the side member, the latchkey having a recess capable of engaging the nub on the front leg, and the latchkey capable of rotating with respect to the side member;
at least one cable joined to the latchkey and capable of manipulating the latchkey between engaged and disengaged positions; and
at least one frame member pivotally joining the front leg to the rear leg and capable of preventing the rear leg from pivoting away from the front leg when the front leg is locked by the locking mechanism; wherein
the front leg is locked in a fixed position with respect to the side member when the latchkey is positioned such that its recess is engaged with the nub on the front leg; and wherein
the front leg is unlocked, thereby capable of rotating with respect to the side member, when the latchkey is positioned such that its recess is disengaged from the nub on the front leg.

3. The infant stroller of claim 2, wherein
upon application of a force to the cable, the latchkey is rotated with respect to the side member such that the recess is disengaged from the nub on the front leg.

4. The infant stroller of claim 2, further comprising:
a latch release control joined to the cable and capable of being depressed by a user.

5. The infant stroller of claim 4, further comprising:
a handle assembly joined to the top of the handle bar; wherein the latch release control is joined to the handle assembly; and wherein the cable is located in the interior of the handle bar.

6. An infant stroller comprising:
at least one side member;
at least one front leg joined to the side member and capable of rotating with respect to the side member;
a tray unit including a tray and at least one tray arm, the tray arm joined to the side member and capable of rotating with respect to the side member, the tray arm having a graduated recess on its side face having a deep end and a shallow end, the shallow end being flush with the side face of the tray arm; and
a tray locking mechanism for preventing rotation of the tray arm with respect to the side member, the tray locking mechanism comprising: a frame; a latchpin capable of engaging the recess in the tray arm; a carrier for holding the latchpin in place and capable of sliding within the frame; a first spring to provide restoring force to the latchpin when depressed; and a second spring to provide restoring force to the carrier; wherein
the latchpin is engaged with the deep end of the recess on the tray arm when the front leg is in an unfolded position with respect to the side member, thereby locking the tray arm and the tray in a fixed position with respect to the side member; and wherein the latchpin is engaged with the shallow end of the recess on the tray arm when the front leg is in a folded position with respect to the side member, thereby allowing the tray arm and the tray to rotate with respect to the side member.

7. The infant stroller of claim 6, wherein the carrier of the tray locking mechanism unit is positioned such that the latchpin is engaged with the deep end of the recess on the tray arm when the front leg is in an unfolded position with respect to the side member, thereby locking the tray arm and the tray in a fixed position with respect to the side member; and wherein upon rotation of the front leg to a folded position, the carrier of the tray locking mechanism unit is positioned such that the latchpin is engaged with the shallow end of the recess on the tray arm, thereby allowing the tray arm and the tray to rotate with respect to the side member.

8. The infant stroller of claim 7, wherein:

the front leg has a nub capable of engaging a latchkey for preventing rotation of the front leg with respect to the side member; and further comprising:

at least one rear leg joined to the side member and capable of rotating with respect to the side member;

at least one handle bar joined to the side member;

a locking mechanism for preventing rotation of the front leg with respect to the side member, the locking mechanism comprising a latchkey pivotally attached to the side member, the latchkey having a recess capable of engaging the nub on the front leg, and the latchkey capable of rotating with respect to the side member; and at least one frame member pivotally joining the front leg to the rear leg and capable of preventing the rear leg from pivoting away from the front leg when the front leg is locked by the locking mechanism; wherein the front leg is locked in a fixed position with respect to the side member when the latchkey is positioned such that its recess is engaged with the nub on the front leg; and wherein the front leg is unlocked, thereby capable of rotating with respect to the side member, when the latchkey is positioned such that its recess is disengaged from the nub on the front leg.

9. The infant stroller of claim 8, further comprising:

a biasing element for biasing the latchkey to a locked position.

10. The infant stroller of claim 9, wherein the biasing element is positioned on the end of the latchkey.

11. The infant stroller of claim 10, wherein the biasing element is a spring, and the spring is received on one end by a nub on the end of the latchkey and is received on the opposite end by a nub on the side member.

12. The infant stroller of claim 8, wherein the stroller can be folded, when the latchkey is positioned such that its recess is disengaged from the nub on the front leg, by rotating the front leg and rear leg such that the side member becomes approximately parallel to the front leg and rear leg.

13. The infant stroller of claim 8, wherein the latchkey includes a wheel portion and an arm portion; and wherein the recess is located on the arm portion.

14. The infant stroller of claim 8, further comprising:

at least one cable joined to the latchkey and capable of manipulating the latchkey between engaged and disengaged positions.

15. The infant stroller of claim 14, wherein upon application of a force to the cable, the latchkey is rotated with respect to the side member such that the recess is disengaged from the nub on the front leg.

16. The infant stroller of claim 14, further comprising:

a latch release control joined to the cable and capable of being depressed by a user.

17. The infant stroller of claim 16, further comprising:

a handle assembly joined to the top of the handle bar; wherein the latch release control is joined to the handle assembly; and wherein the cable is located in the interior of the handle bar.

* * * * *